United States Patent Office 3,380,844
Patented Apr. 30, 1968

3,380,844
COATING COMPOSITION AND METHOD FOR APPLYING SAME TO POLYOLEFIN FILMS
Virginia C. Menikheim, Chapel Hill, N.C., and Esther M. Rodriguez, La Grange Park, Ill., assignors to Union Carbide Corporation, a corporation of New York
No Drawing. Filed Dec. 30, 1963, Ser. No. 334,585
12 Claims. (Cl. 117—47)

ABSTRACT OF THE DISCLOSURE

The surface of polyolefin films is coated with a composition which imparts to the coated polyolefin film substantially improved heat seal strength and oxygen and moisture vapor transmission values and renders the film resistant to greases, oils and most chemicals. The coating composition contains a vinylidene chloride polymer, an aliphatic acid and an ester.

---

This invention relates generally to coated polyolefin film and, more particularly, to self-supporting polyolefin film coated on at least one of its surfaces with a tenaciously adhering polymeric coating composition resistant to oils and solvents and having low oxygen and moisture vapor transmission values, which coated film has good heat seal strength.

Polyolefin film has found widespread use as a wrapping and packaging material for many articles of commerce because of its flexibility, transparency, low moisture vapor permeability, resistance to the action of many chemicals, and similar, allied properties. Polyolefin films are, however, unduly permeable to oxygen and are generally not as resistant to essential oils, greases and similar substances as is desired by the packaging industry.

It has recently been discovered that polyolefin films can be satisfactorily coated with resins comprising vinylidene chloride containing polymers, which coatings render such polyolefin films generally more impervious to most gases and sufficiently resistant to the action of most chemicals and greases for food packaging applications. It is desirable that the coatings be applicable uniformly and in a latex form that the coating tenaciously adhere to the film, and that the coated film be heat sealable.

It is, therefore, an object of this invention to provide a coated polyolefin film which has a particularly low oxygen transmission factor and has high seal strength.

It is another object of this invention to provide such a coated film which retains its seal strength over a period of time.

It is still another object of this invention to provide a coated film wherein the coating tenaciously adheres to the base material.

It is a further object of this invention to provide such a coated film which is resistant to greases, oils and most chemicals.

It is a still further object of the invention to provide a coating which can be uniformly applied while in a latex form.

Throughout the remainder of this specification, polyolefin films will be exemplified by polyethylene. It is understood, however, that the practice of this invention is not limited to pure or unmodified polyethylene including both low and high density polyethylene, but is also applicable to other olefinic polymers such as polypropylene, polybutene and polystyrene, to mixtures thereof, and to copolymers from mixtures of ethylene, propylene or butene monomers or polymers. The term polyolefin film, is also meant to encompass such polymers to which have been added modifiers such as stabilizers, slip agents, pigments, anti-static agents, anti-blocking agents, anti-fog agents, and/or dyes in quantities conventionally employed for the intended purpose.

Constituent propositions set forth herein are by weight unless otherwise specified.

In accordance with the present invention, there is provided a polyolefin film having a polymeric oxygen impervious coating on at least one surface thereof, which coating is the polymerization product of 85 to 90 weight percent vinylidene chloride; 3 to 9 weight percent of at least one ester selected from the group consisting of methyl acrylate, ethyl acrylate, methyl methacrylate, and ethyl methacrylate; and 2 to 8 weight percent of at least one unsaturated aliphatic acid selected from the group consisting of acrylic acid, methacrylic acid and itaconic acid. The preferred ester monomer is ethyl acrylate. The preferred acid monomer is acrylic acid. The preferred composition to provide a coated polyolefin film having relative insensitivity of moisture is a copolymer of 88 to 90 weight percent vinylidene chloride; 7 to 9 weight percent ethyl acrylate; and 2 to 4 weight percent acrylic acid. The preferred composition to provide a coated polyolefin film having relatively low blocking values is a copolymer of 88 to 90 weight percent vinylidene chloride; 3 to 5 weight percent ethyl acrylate; and 6 to 8 weight percent acrylic acid. Where methacrylic acid is used, the optimum proportion in the copolymer is 3 to 8 weight percent. Where itaconic acid is used, the optimum proportion in the copolymer is 5 to 8 weight percent.

The polymerization product of a monomer charge having vinylidene chloride in percentages greater than 90 weight percent produces brittle coatings and results in coated film having too low an extensibility as measured by ASTM Test D–882–56T (1958, p. 335, Method B). Further, such compositions made with a monomer charge of greater than 90 weight percent vinylidene chloride result in copolymers which are difficult to fuse and generally result in non-uniform coatings. Less than 85 weight percent vinylidene chloride in the monomer charge results in a copolymer which when coated on a polyolefin film results in too high a level of oxygen transmission.

The acrylate or methacrylate ester concentration in the monomer charge is critical in that more than 9 weight percent thereof results in a copolymer which when coated on a polyolefin film tends to block readily whereas less than 3 weight percent of acrylate or methacrylate results in a polymer which when coated on a polyolefin film results in a coated film having too low an extensibility.

The polymerizable acid concentration in the monomeric charge is critical in that less than 2 weight percent acid results in a coating composition which does not adequately wet even a modified polyolefin surface, whereas more than 8 weight percent acid results in coating compositions that are moisture sensitive at a relative humidity of 85 percent or more. The term "moisture sensitive" refers to the tendency of the coated film to block excessively at high humidity conditions.

The size of the alkyl groups in the acrylic ester copolymerized with vinylidene chloride and the unsaturated acid is important in that it has been found that only a methyl or ethyl ester yields a copolymer having, as a film coating, good extensibility, low oxygen transmission, good clarity, adequate anti-blocking characteristics, good slip, and non-strippable adhesion to polyolefin surfaces. Acrylic esters having alkyl groups containing more than 2 carbon atoms are not entirely satisfactory; butyl acrylate, for example, results in a more tacky coating, hexyl and octyl results in more brittle and inelastic coatings than ethyl or methyl esters within the critical percentages set forth herein.

It has been found that the surface of the polyolefin film to be coated should have a wetting tension value such that it is wetted at least for a few seconds by liquids having a surface tension value of at least 41 dynes per centimeter in order to permit vinylidene chloride copolymer coatings applied thereto to adhere well. A method of determining the wetting tension value of a polyolefin surface is described in more detail hereinafter. This method relies upon the comparison of the surface tension of known liquid mixtures and the effect of the surface in question on them. In particular, previously calibrated mixtures of formamide and 2-ethoxyethanol are preferably used to determine wetting tension.

Since polyolefin films do not generally exhibit wetting tensions sufficiently high to make them amenable to coating with polymers according to this invention, it has been found expedient to modify the surfaces of these films by a suitable pretreatment in order to improve their surface characteristics, particularly their wetting tension. This modification results in increasing the wetting tension value of the surface to be coated. This pretreatment can be accomplished by means of exposure to an open flame, chlorine in the presence of light, chemical oxidation, high voltage stress accompanied by corona discharge or other similar methods.

Treatment of polyolefin surfaces with high voltage stress accompanied by corona discharge to impart ink receptivity to said surfaces is disclosed in British Patent No. 715,914. It has been found preferable when using low frequency corona discharge to subject a polyolefin film to successive treatments of this nature rather than attempting to properly modify the film in one pass. One pass modification of polyolefin films to a desired surface wetting tension value can be accomplished by using high frequency corona discharge techniques. In this particular invention, it has been found that, while a wetting tension of 41 dynes per centimeter is sufficient for good coating adhesion, surfaces treated by high voltage stress accompanied by corona discharge techniques are preferably modified to exhibit at least 54 dynes per centimeter wetting tension.

The treatment of polyolefin films by means of an open flame is disclosed in United States Patent No. 2,704,382. When surface modification by this technique is employed, a wetting tension value of at least 41 dynes per centimeter should be realized before attempting to apply an adherent coating to the surface.

Treatment of polyolefin film by chlorination under ultra-violet light is disclosed in United States Patent No. 2,502,841. Again, a wetting tension value of at least 41 dynes per centimeter must be realized when using this type of treatment.

Treatment of polyolefin film by oxidation suitably employs potassium permanganate, sodium dichromate, or ozone for example, as the oxidizing agent.

Coating compositions according to this invention can be applied to polyolefin films either from an aqueous latex, or a solution in volatile organic solvent. It is preferred, however, to apply such coatings in latex form. For latex application, a mixture of monomers of the composition described above can be blended with water, and an emulsifier acidified, mixed with a polymerization initiator and an activator, and agitated. The polymerization in a latex should be allowed to proceed to at least a 95 percent conversion of monomer to polymer. One particular latex coating composition which was found to perform quite well was prepared by reacting a mixture of 32.6 percent of a monomeric mixture according to this invention; 65.6 percent oxygen-free water; about 1.3 percent of a 30 percent aqueous sodium alcohol sulfate emulsifier solution; 0.36 percent of 4 normal sulfuric acid; and about 0.07 percent each of ammonium persulfate initiator and sodium metabisulfate activator. In the preparation of this specific latex, agitation was at 18 revolutions per minute for about four hours during which time the temperature was maintained at 35° C. Resins high in vinylidene chloride content become more crystalline in the latex dispersion as the latex ages; consequently the wettability and fusion characteristics of the latices decrease and the oxygen permeability of the films coated from such latices increase with the age of the latex coating composition prior to application. Therefore, it is important that the application of the coatings be made before the dispersed resin becomes too crystalline to readily form a continuous barrier coating.

Where the coating composition is to be applied from a solution, it is preferred to polymerize by emulsion, bulk or suspension polymerization to a conversion of between about 70 percent and about 90 percent with subsequent solution in some solvent which is totally vaporizable and which does not leave a residue upon evaporation. One example of such a solvent is a tetrahydrofuran. It is practical to use a 10 percent polymer solution in this solvent for coating purposes.

A coating according to this invention may be applied by dipping, spraying, brushing, rolling, doctoring, painting or the like in a conventional manner. Polyolefin films coated with compositions according to this invention by any of the above means must be dried to remove the solvent or carrier, whichever is present. This can be accomplished by passing the coated film through a heater which may, for example, conveniently be an infra-red source. It has been found particularly expedient to use two sets of heating zones, the first being set at a somewhat lower temperature than the second in order to effect relatively gradual drying. When the first heater was maintained between 55° C. and 60° C. and the second heater was maintained between 75° C. and 80° C., the coated film, polyethylene, was preferably fed through the heaters at 23.5 inches per minute. It is, of course, understood that these speeds and temperatures are not limiting factors in the practice of this invention, but are exemplary thereof. Modification will be available to those skilled in this art depending upon the specific coating composition; the thickness of the coating, the particular polyolefin film, and the particular coating application method chosen. It has been found expedient to apply coatings of a thickness from about 0.005 to about 0.5 mil. It is preferred to use coatings of thickness between about 0.03 and about 0.08 mil.

Table I below shows various coating compositions applied to 1.5 mil polyethylene film. The polyethylene film was modified on both surfaces thereof by treatment with chlorine gas under ultra violet light to a wetting tension level of 43 dynes per centimeter and both surfaces were coated from a latex to a thickness of about 0.05 mil.

TABLE I

| Run No. | 1 | 2 | 3 | 4 |
| --- | --- | --- | --- | --- |
| Monomer charge (wt. percent): | | | | |
| Vinylidene chloride | 89 | 89 | 89 | 89 |
| Ethyl Acrylate | 8 | 6 | 4 | 3 |
| Acrylic Acid | 3 | 5 | 7 | 8 |
| Blocking Value (gms.): | | | | |
| Fresh | 380 | 230 | 85 | 45 |
| Aged | 185 | 180 | 40 | 0 |
| Oxygen Transmission (cc./100 in.²/24 hrs./ 0.1 mil of coating) | 3.8 | 3.9 | 2.7 | 2.5 |
| Heat Seal Strength (T.D. gms./cm.): | | | | |
| 8 days | 660 | 613 | 572 | 665 |
| 30 days | 665 | 620 | 660 | 658 |
| Haze (percent) | 2.6 | 2.9 | 2.9 | 4.1 |

A comparison of the data presented in Table I above with the results of similar tests run on other materials shows the dramatic improvement obtained by the practice of this invention.

The oxygen transmission of identical polyethylene film untreated and uncoated is 480; after modifying both surfaces as described above, this value is still 350.

The haze of identical polyethylene film unmodified and uncoated is 10.0; after modifying both surfaces as described above, this value is still 8.0.

The heat seal strength of identical polyethylene film coated with the polymerization product of 92 percent vinylidene chloride, 5 percent ethyl acrylate, and 3 percent acrylic acid is only 512 after 8 days and falls to 200 after 30 days.

The blocking value of identical polyethylene film coated with the polymerization product of 86 percent vinylidene chloride, 11 percent ethyl acrylate and 3 percent acrylic acid is higher than 1000. The same coated polyethylene has an oxygen transmission of 6.1 and a haze value of 4.7 percent.

An identical polyethylene film coated with the polymerization product of 89 percent vinylidene chloride, 1 percent ethyl acrylate, and 10 percent acrylic acid showed that the coating was so brittle that it disintegrated (minute cracking and flaking).

Thus, it is seen that a polyolefin film coated with a polymeric composition as defined herein is vastly superior to uncoated polyolefin films and that the coating composition is critical within the limits specified.

Blocking value is the force in grams necessary to separate 16 square inches adhering to identical film measured as follows: two strips of film 4 inches by 5 inches are pressed together under a 30 pound load for 3 days at 49° C. After this time the films are manually separated for ½ inch on each short end thus leaving 4 inch squares adhering to each other. The separated half inch on each end of each film are attached respectively to a fixed and movable plate also 4 inches by 4 inches. The movable plate is on one arm of a balance and weights are added to the other arm of the balance until the films separate. This weight is the blocking value.

Oxygen transmission is measured by ASTM Method No. D-1434-58.

Haze is measured by ASTM Test No. D-1003-52.

Heat seal strength is measured by ASTM Test No. D-882-56T, ASTM Standards, 1958, p. 335, Method B. The phrase "wetting tension" as used herein is defined as the minimum surface tension of a liquid mixture of formamide and Cellosolve that will not break up into droplets within a specified period of time, when said liquid is spread upon the polyolefin surface.

Although a specific mixture of liquid chemicals is used herein, it is to be understood that other liquids alone or in mixtures can be used to obtain the wetting tension values described. It being understood that when using other liquid chemicals, the wetting tension numerical values will not necessarily be the same. However, other liquid wetting tension values can be standardized against the formamide-Cellosolve mixture described herein.

The wetting tension values are obtained by the method described below.

A series of mixtures of chemically pure formamide and Cellosolve (2-ethoxyethanol) are prepared having the wetting tension values listed below:

| Formamide, Percent by Volume | Cellosolve, Percent | Wetting Tension, dynes/cm. |
|---|---|---|
| 0 | 100.0 | 30 |
| 2.5 | 97.5 | 31 |
| 10.5 | 89.5 | 32 |
| 19.0 | 81.0 | 33 |
| 26.5 | 73.5 | 34 |
| 35.0 | 65.0 | 35 |
| 42.5 | 57.5 | 36 |
| 48.5 | 51.5 | 37 |
| 54.0 | 46.0 | 38 |
| 59.0 | 41.0 | 39 |
| 63.5 | 36.5 | 40 |
| 67.5 | 32.5 | 41 |
| 71.5 | 28.5 | 42 |
| 74.7 | 25.3 | 43 |
| 78.0 | 22.0 | 44 |
| 80.3 | 19.7 | 45 |
| 83.0 | 17.0 | 46 |
| 87.0 | 13.0 | 48 |
| 90.7 | 9.3 | 50 |
| 93.7 | 6.3 | 52 |
| 96.5 | 3.5 | 54 |
| 99.0 | 1.0 | 56 |
| 100.0 | 0 | 57 |

In practice each mixture is stored in a small mouth bottle supplied with a suitable cap to prevent evaporation and contamination. For fractional wetting tension values the mixtures may be prepared by extrapolating between the values listed in the table.

The procedure for testing the treated surface is carried out at a temperature of 20-25° C. and at relative humidity of 50% and is essentially as follows:

(1) A fresh cotton swab is wetted with one of the mixtures using a minimum amount of liquid.

(2) Using the cotton swab, the liquid is spread lightly over an area of approximately one square inch, using only one stroke to spread the liquid.

What is claimed is:

1. A polyolefin film having a polymeric, oxygen impervious coating on at least one surface thereof, said coating comprising the polymerization product of 85 to 90 weight percent vinylidene chloride; 3 to 9 weight percent ethyl acrylate; more than 3 but less than 8 weight percent acrylic acid.

2. A coated polyolefin film according to claim 1 wherein said acid component is 5 to 8 weight percent itaconic acid.

3. A coated polyolefin film according to claim 1 wherein said polyolefin is selected from the group consisting of polymers of ethylene, propylene, butene and styrene.

4. A coated polyolefin film according to claim 1 wherein said polyolefin is polyethylene.

5. A coated polyolefin film according to claim 4 wherein said polyethylene surface has a wetting tension of at least 54 dynes per centimeter.

6. A polyolefin film having a polymeric, oxygen impervious coating on at least one surface thereof, said coating comprising the polymerization product of 88 to 90 weight percent vinylidene chloride, 7 to 9 weight percent ethyl acrylate, and more than 3 to about 4 weight percent acrylic acid.

7. A polyolefin film having a polymeric, oxygen impervious coating on at least one surface thereof, said coating comprising the polymerization product of 88 to 90 weight percent vinylidene chloride, 3 to 5 weight percent ethyl acrylate and 6 to 8 weight percent acrylic acid.

8. The method of forming a coated polyolefin film which is substantially impervious to oxygen and water vapor, which method comprises surface treating at least one surface of said polyolefin film until a wetting tension value of at least 41 dynes per centimeter is attained; and coating said treated surface with the polymerization product consisting essentially of the monomers of 85 to 90 weight percent vinylidene chloride, 3 to 9 weight percent ethyl acrylate, and more than 3 but less than 8 weight percent of at least one acid selected from the group consisting of acrylic acid and itaconic acid.

9. The method of claim 8 wherein said polyolefin film surface is treated until a wetting tension value of at least 54 dynes per centimeter is attained.

10. A coating composition for polyolefin film comprising the polymerization product consisting essentially of the monomers of 85 to 90 weight percent vinylidene chloride; 3 to 9 weight percent ethyl acrylate; and more than 3 but less than 8 weight percent of at least one acid selected from the group consisting of acrylic acid and itaconic acid.

11. A coating composition for polyolefin film consisting of the polymerization product of 85 to 90 weight percent vinylidene chloride; 7 to 9 weight percent ethyl acrylate, and 2 to 4 weight percent acrylic acid.

12. A coating composition for polyolefin film consisting of the polymerization product of 88 to 90 weight percent vinylidene chloride, 3 to 5 weight percent ethyl acrylate, and 6 to 8 weight percent acrylic acid.

(References on following page)

References Cited

UNITED STATES PATENTS

| | | | |
|---|---|---|---|
| 2,810,933 | 10/1957 | Pierce et al. | 117—138.8 X |
| 3,021,229 | 2/1962 | Morgan | 117—161 X |
| 3,170,888 | 2/1965 | Kutik et al. | 260—29.6 |
| 3,255,034 | 6/1966 | Covington et al. | 117—138.8 X |

FOREIGN PATENTS

| | | |
|---|---|---|
| 654,342 | 6/1951 | Great Britain. |
| 727,414 | 3/1955 | Great Britain. |

WILLIAM D. MARTIN, *Primary Examiner.*

MURRAY KATZ, *Examiner.*

R. HUSACK, *Assistant Examiner.*